United States Patent [19]

Pradel et al.

[11] Patent Number: 5,277,284
[45] Date of Patent: Jan. 11, 1994

[54] CONTAINER ROD ASSEMBLY

[75] Inventors: Robert Pradel, Röthlein-Heidenfeld; Gerald Fenn, Pfersdorf, both of Fed. Rep. of Germany

[73] Assignee: Fichtel & Sachs AG, Schweinfurt, Fed. Rep. of Germany

[21] Appl. No.: 841,374

[22] Filed: Feb. 25, 1992

[30] Foreign Application Priority Data

Mar. 2, 1991 [DE] Fed. Rep. of Germany ....... 4106651

[51] Int. Cl.⁵ ............................ F16F 9/36; F16J 15/34; F16L 17/04
[52] U.S. Cl. .................................. 188/322.17; 277/95; 285/95
[58] Field of Search ............... 188/322.18, 322.16, 188/322.17; 277/81D; 277/82; 277/91; 277/94; 277/95; 285/95, 113

[56] References Cited

U.S. PATENT DOCUMENTS

| 2,299,216 | 10/1942 | Ericsson | 188/322.18 |
| 2,444,874 | 7/1948 | Hanson | 277/68 |
| 4,175,755 | 11/1979 | Geary | 277/94 X |
| 4,212,473 | 7/1980 | Arai | 277/81 P |
| 4,544,167 | 10/1985 | Giroux | 277/82 |

FOREIGN PATENT DOCUMENTS

| 230743 | 8/1987 | European Pat. Off. | 188/322.17 |
| 246972 | 11/1987 | European Pat. Off. | 188/322.17 |
| 0266664 | 5/1988 | European Pat. Off. | |
| 330449 | 8/1989 | European Pat. Off. | 188/322.17 |
| 0384741 | 8/1990 | European Pat. Off. | |
| 2915728 | 10/1979 | Fed. Rep. of Germany | |
| 3434011 | 3/1986 | Fed. Rep. of Germany | 188/322.17 |
| 3613154 | 10/1987 | Fed. Rep. of Germany | 188/322.17 |
| 1156365 | 5/1958 | France | 188/322.18 |
| 2573838 | 5/1986 | France | |
| 667141 | 9/1988 | Switzerland | 277/81 P |
| 824964 | 12/1959 | United Kingdom | 188/322.17 |
| 2104186 | 3/1983 | United Kingdom | 188/322.17 |
| 2115903 | 9/1983 | United Kingdom | 188/322.17 |

Primary Examiner—Robert J. Oberleitner
Assistant Examiner—Alfred Muratori
Attorney, Agent, or Firm—Brumbaugh, Graves, Donohue & Raymond

[57] ABSTRACT

In a spring strut a piston rod is guided through a sealing ring which is accommodated within a groove. This groove has a localization line which has varying height above a reference plane axially fixed and orthogonal with respect to the axis of the cylinder of the spring strut. The groove is confined by two groove confining members which are shaped such that they can be manufactured by a non-cutting shaping process, such as injection-moulding or sintering.

38 Claims, 5 Drawing Sheets

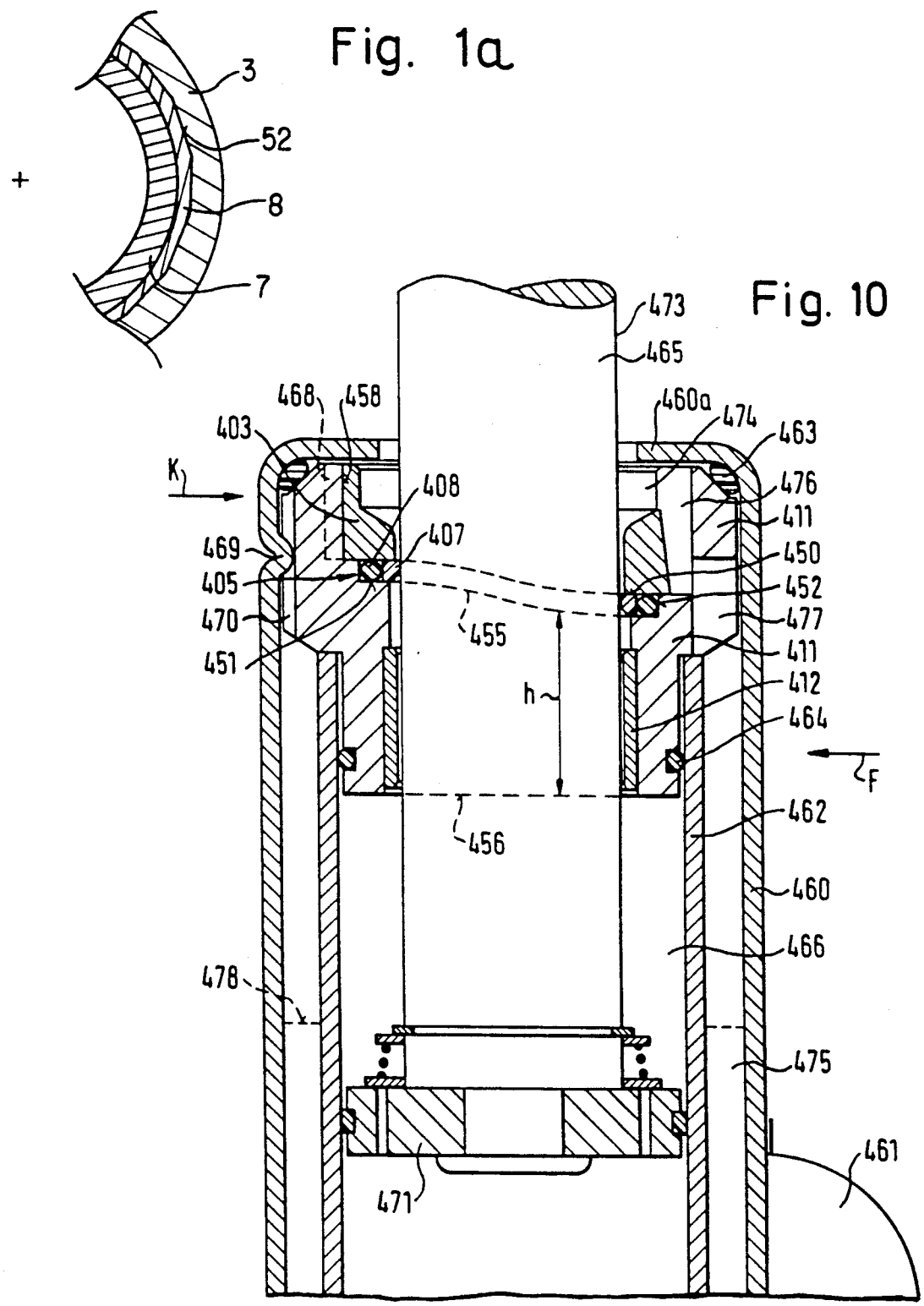

CONTAINER ROD ASSEMBLY

BACKGROUND OF THE INVENTION

In many technical appliances, a rod is sealingly guided through a sealing unit of a container. This is true in shock absorbers and is also true for rotatable exit shafts of gear boxes and internal combustion engines. The rod—and this is true both for an axially movable piston rod of a shock absorber unit as well as for a rotatable output shaft of a gear box or an engine housing—is frequently loaded in a radial direction at the location of the sealing unit. This radial load results in premature wear of the sealing means and in frictional resistance against the respective movement.

STATEMENT OF THE PRIOR ART

From German Publication 29 15 728 it is known to arrange the sealing means of a shock absorber in a motor-vehicle spring strut such that the pressurized fluid within a cylinder of the shock absorber unit exerts a compensating force onto the piston rod member at the location of the sealing unit, which compensating force at least partially compensates for the radial load. In this known arrangement, the sealing ring is guided along an undulated line which has variable axial distance from a reference plane fixed with respect to the shock absorber housing and perpendicular to the axis of the piston rod. The maximum height of the inner side of the respective sealing ring is located at a position located in alignment with the direction of the radial force. By this localization, the piston rod is subject on its side remote from the attack of the radial force to a compensation force. This compensation force is the result of an enlarged side face of the piston rod being subject to the pressure of the pressurized fluid.

In the known embodiment, the sealing ring of the shock absorber unit is accommodated within a housing of a guiding and sealing unit of the shock absorber cylinder.

In the German Publication 29 15 728, there is no disclosure as to the manufacturing of the groove. The normal way of manufacturing is a milling operation. Such a milling operation is complicated and expensive, if the groove is non-planar, i.e., if the axial distance of the groove from a reference plane is variable along the circumference of the groove.

It is particularly difficult to define the angular location of the turning point of the groove accommodating the sealing ring. As a result thereof, it is possible that in the region of the turning points there occur either leakages of fluid or increased friction conditions.

OBJECT OF THE INVENTION

It is a primary object of the present invention to facilitate the manufacturing of the groove accommodating the sealing ring. A further object is to locate the turning point of the groove and of the sealing ring in angular direction such that it is in the desired position with respect to the direction of a radial load to be expected in operation.

SUMMARY OF THE INVENTION

A container rod assembly comprises a container having a cavity confined by wall means and a cylindrical rod member having an axis and extending in axial direction through the wall means. This rod member passes adjacent said wall means through a sealing unit and is movable in at least one of an axial direction and a circumferential direction around said axis. The sealing unit comprises a radially inwards open annular groove adjacent an external cylindrical face of the rod member. The annular groove accommodates a sealing ring arrangement sealing the rod member with respect to the cavity. The annular groove is confined by two axially spaced and substantially axially oppositely directed annular side faces and by a substantially radially inwards directed bottom surface. One of the side faces is nearer to the cavity. At least this side face is an undulated side face following a localization line around the axis. The localization line has variable distance from a reference plane axially fixed with respect to the container and perpendicular to the axis of the rod member.

The sealing unit comprises at least two separate sealing groove confining members. One of these sealing groove confining members provides a first portion of the side faces, and the other one of the sealing groove confining members provides a second portion of the side faces. At least one of the sealing groove confining members with the respective portion of the side faces has a shape such as to be formable by a non-cutting shaping process, such as one of a pressure-moulding process, an injection-moulding process, a sintering process, a cold-shaping process and a die-casting process.

According to the invention, it is easy to provide particular geometric forms of the groove. More particularly, sections of the groove which are parallel to a plane orthogonal with respect to the axis can be provided with the location and the circumferential length of these section being selected in accordance with need. A further essential advantage of the invention lies in the fact that the turning points can be located in well defined points or zones.

At least one of the sealing groove confining members may be made from one of a synthetic plastics material and a metallic material.

According to a preferred embodiment, at least one of said sealing groove confining members is an annularly closed confining member providing a complete side face. More particularly, a first one of the sealing groove confining members is an annularly closed confining member providing a first complete side face, and a second one of the sealing groove confining members is a further annularly closed confining member providing a second complete side face.

The sealing groove confining members may be provided with positioning means positioning said sealing groove confining members with respect to each other in a predetermined relative operational position and possibly positioning the entity of sealing groove confining members with respect to the container and to the rod member.

More particularly, the sealing groove confining members may be provided with at least one of axially, radially and circumferentially effective positioning means.

In case of the possible existence of a bottom surface, at least one of the at least two sealing groove confining members may provide at least a portion of the bottom surface of said groove. More particularly, the complete bottom surface of the groove may be provided by this sealing groove confining member.

The positioning means may comprise first positioning means on a first one of the sealing groove confining members and second positioning means on a second one of the sealing groove confining members. These first positioning means and these second positioning means may be in direct mutual engagement. Further positioning means of at least one of the groove confining members may be helpful for positioning both sealing groove confining members with respect to the container. It is to be noted, however, that one of the sealing groove confining members may also be an integral part of the wall means.

The sealing groove confining members may also be assembled with and positioned with respect to a common carrier member by respective positioning means. This carrier member may again be positioned in axial or/and radial or/and circumferential direction with respect to the container by further positioning means.

According to a most appropriate embodiment, the at least two sealing groove confining members have interengaging annular positioning means for positioning the sealing groove confining members both in axial and radial direction in a relative operational position. In addition thereto, the sealing groove confining members may be positioned in an angular direction about the axis in a relative angular position by angular positioning means. These angular positioning means may comprise interengaging groove and spline means. According to an alternative embodiment, the angular positioning means may comprise a positioning pin intersecting with the sealing groove confining members. According to a further alternative embodiment, the angular positioning means may comprise a positioning ball engageable with ball engagement faces of the sealing groove confining members.

According to a further embodiment, the at least two sealing groove confining members may be accommodated within a radially inner annular recess of an annular carrier member. E.g., the sealing groove confining members may be in sandwich arrangement within the annular carrier member. In such case, the sandwiched sealing groove confining members may be axially fixed within the carrier member by a cover member covering the annular recess at an axial end thereof. This cover member may be axially positioned by a should face of the carrier member. Moreover, axial positioning of the cover member may be obtained in that the cover member is axially fixed by the shoulder face in a first axial direction and by deformations of the carrier member in a second axial direction.

The sealing ring means may comprise at least one sealing ring made of reinforced synthetic plastics material. Alternatively, the sealing ring means may comprise at least one sealing ring made of a lubricant-containing sintered bronze.

The bottom face may have a polygonal contour about the axis. This is only one of several possibilities of fixing the angular location of the sealing ring means within the groove.

The localization line may have two substantially diametrically opposite sections substantially parallel to the reference plane. These opposite sections substantially parallel to the reference plane may have different circumferential lengths, in accordance with the compensation forces to be obtained. Moreover, the opposite sections substantially parallel to said reference plane may be asymmetrically located with respect to a common diameter through the axis.

According to a further embodiment, the sealing groove confining members are annular segments. Those annular segments may have a circumferential length of less than about 180°. These annular segments may provide a portion of each of the side faces.

The container may contain a pressurized fluid. In this case, an external portion of the rod member extending beyond the wall means outside the cavity may be loaded by a radial load in a predetermined radial direction. For compensating this load, the localization line may be angularly located such with respect to this predetermined radial direction that the pressurized fluid exerts a compensation force onto the rod member substantially opposite to this load adjacent the sealing unit.

The sealing unit may be located in a carrier member. This carrier member may provide an annular guiding face for the rod member. It is to be noted that the carrier member may be one of the sealing groove confining members. It is further to be noted that the carrier member may also be an integral part of the container. If the carrier member is a part separate from the container, the carrier member and the container member may be provided with positioning means for positioning the carrier member with respect to the container member in axial or/and radial or/and circumferential direction.

The side faces are preferably substantially equidistant in axial direction along the localization line. In this case, the configuration of the sealing ring means is most simple, because the sealing ring means have constant axial height along their complete circumference. The sealing ring means may be produced as substantially planar sealing ring means which are only reshaped when being inserted into the groove. This is particularly true, if the sealing ring means are made of a resilient material and have a simple cross-sectional form, such as a circular cross-sectional form (when regarded in a plane containing the axis).

It is, however, also possible that a further one of the side faces (the one more remote from the cavity) is located in a plane substantially perpendicular to the axis. In this case, the sealing ring arrangement may have variable axial height along the localization line.

The container may be a cylindrical container of a shock absorber unit. In this case, the rod member is a piston rod member of the shock absorber unit, which piston rod member is axially movable with respect to the sealing unit. More particularly, the shock absorber unit may be part of a spring strut of a motor-vehicle which is subject to transverse forces introduced by a respective vehicle wheel.

According to a further embodiment, the container may be a housing accommodating rotatable drive means. In this case, the rod may be an exit shaft of the rotatable drive means, and this exit shaft may be connected with torque transmission means outside the cavity. Such, it is again possible to compensate for radial forces acting onto the exit shaft through the torque transmission means connected with the exit shaft outside the cavity.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which

FIG. 1a is a partial cross section at Ia of FIG. 1.

FIG. 10 is a section through a shock absorber unit of a spring strut with a sealing unit of the present invention;

DETAILED DESCRIPTION OF THE PREFERRED EMBODIMENTS

Figure 1:
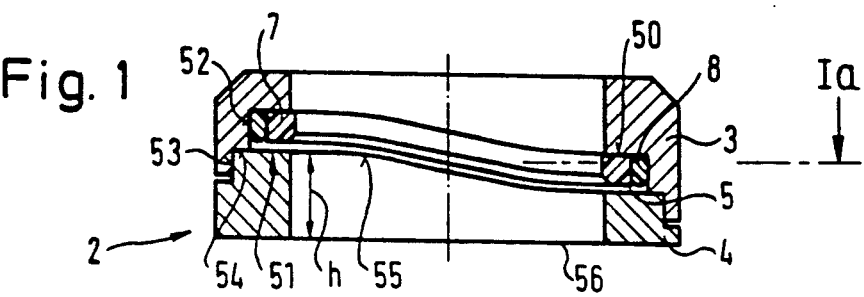
FIG. 1 is a section through a sealing unit.

FIG. 1 represents a sectioned sealing unit 2. This sealing unit consists of an upper part 3 and a lower part 4. The groove 5 which receives the seal 7,8 is defined by an upper side face 50, a lower side face 51 and a bottom surface 52. The upper side face 50 and the bottom surface 52 are provided on the upper part 3. The lower side face 51 is provided on the lower part 4. Such, the upper part 3 and the lower part 4 can be regarded as groove confining members 3 and 4. The groove confining members 3 and 4 are radially centered with respect to each other by interengaging annular faces at 53 and are axially positioned with respect to each other by axial positioning faces at 54. The groove 5 is radially open in inwards direction. The groove 5 accommodates a sealing ring 7, which is backed and tensioned by an 0-ring 8. The groove confining members 3 and 4 are annularly closed and can be easily manufactured in spite of the selected form of the groove. The selected form of the groove can be defined in saying that a localization line 55 has a varying height h above a reference plane 56. The groove confining members 3 and 4 can be easily manufactured with the respective faces 50, 51 and 52 by a moulding or sintering process.

Figure 2:
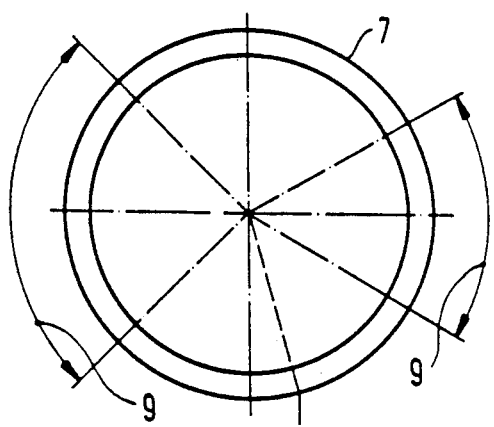
FIG. 2 is a top view of a slantingly disposed sealing ring with plane-parallel peripheral regions of different sizes.
Figure 3:
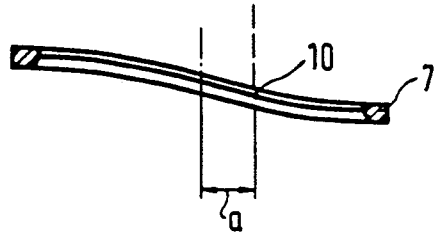
FIG. 3 is a sectional view of the slantingly disposed sealing ring of FIG. 2.

FIG. 2 shows in connection with FIG. 3 a sealing ring 7 in the incorporated position as an individual part. The plane-parallel peripheral regions 9 may be matched to the magnitude of side forces. It follows from this that the turning points 10 of the sealing ring 7 are shifted in the direction of the smaller loading. The turning points 10 of the sealing ring 7 may be locally tensioned at the bottom of the groove by specific measures. It may be possible to use polygonally extending annular grooves in the sealing unit 2 as illustrated in FIG. 1a.

Figure 4:
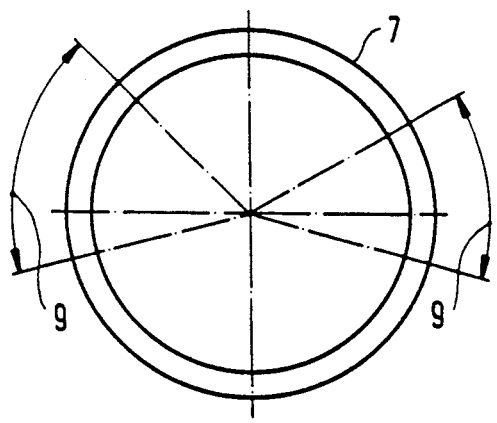
FIG. 4 is the top view of a slantingly disposed sealing ring with asymmetrically mounted plane-parallel peripheral regions.
Figure 5:
FIG. 5 is a sectional view of the sealing ring of FIG. 4.

FIG. 4 illustrates in conjunction with FIG. 5 a further advantageous construction of the annular groove. The plane-parallel peripheral regions 9 of the sealing ring 7 are arranged asymmetrically. Thereby, influences connected with the axial suspension—particularly when running around curves—can be taken into consideration, whereby the effect of the sealing can be used in further optimized manner.

Figure 6:
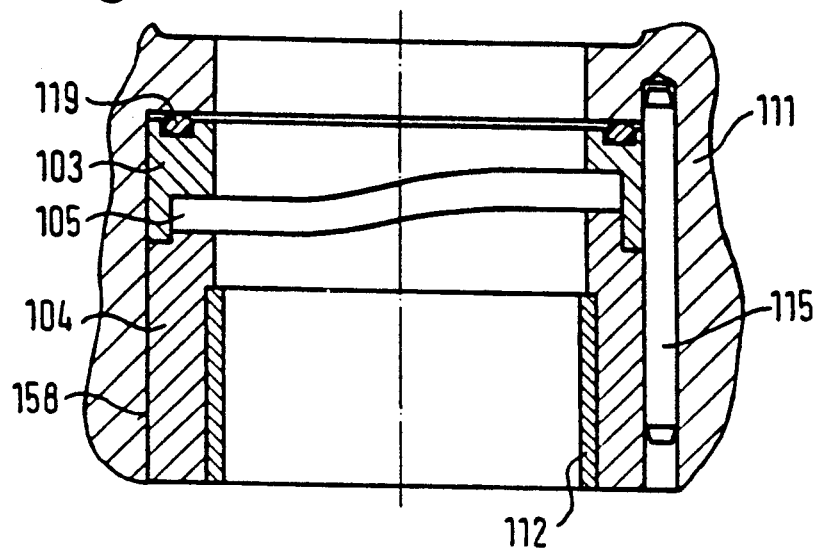
FIG. 6 is a sectional view through a sealing unit with a pin as a positioning element.

In FIG. 6, the groove confining members 103 and 104 are provided within a carrier member 111. This carrier member 111 has additionally the function of a guide member and is provided with a guiding sleeve 112. The groove confining members 103,104 are accommodated within an annular internal recess 158 of the carrier member 111. The groove 105 accommodates sealing ring means as illustrated in FIG. 1. A further sealing ring 119 is provided between the carrier member 111 and the groove confining member 103. A positioning pin 115 is engaged with the carrier member 111 and the groove confining members 103,104.

Figure 7:
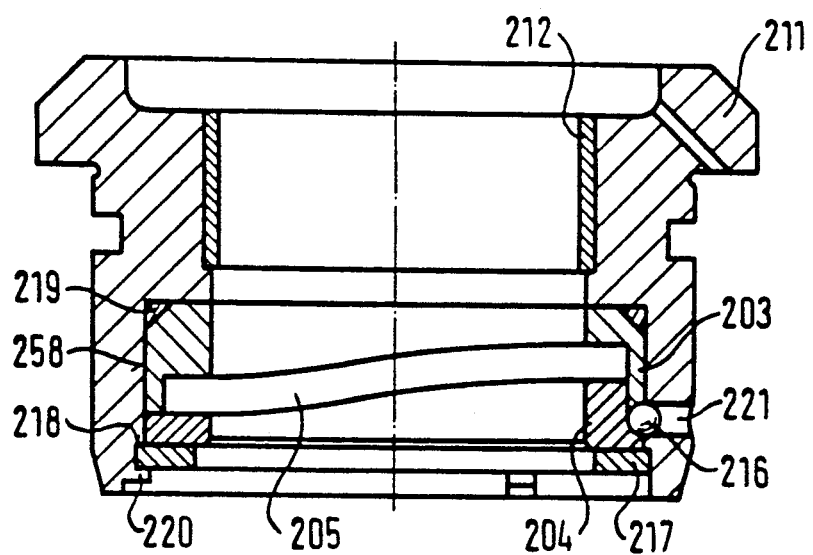
FIG. 7 is a sectional view through a sealing unit with a ball as a positioning element.

FIG. 7 shows a further sealing unit comprising a carrier member 211 with a guiding sleeve 212. An internal annular recess 258 accommodates the groove confining members 203 and 204. The groove 205 is again confined by these groove confining members 203,204. The groove confining members 203,204 are axially located by a cover plate 217. This cover plate 217 is axially upwards supported by a shoulder face 218 of the carrier member 211. In the downwards direction, the cover plate 217 is axially supported by caulking lugs 220. The upper groove confining member 203 is sealed with respect to the carrier member 211 by a sealing ring 219. For angular positioning of the groove confining members 203,204, a ball member 216 is provided which is introduced through a bore 221 of the carrier member 211 and engages spherical positioning faces of the groove confining members 203,204. The ball 216 can be introduced after prepositioning the carrier member 211 and the groove confining members 203,204 by a pin-like tool. Hereafter, the ball 216 is driven into the bore 221. The groove confining member 204 may be made by an economic plastic injection-moulding process. In this case, the cover plate 217 protects the groove confining member 204 against damage during the formation of the caulking lugs 220.

Figure 8:
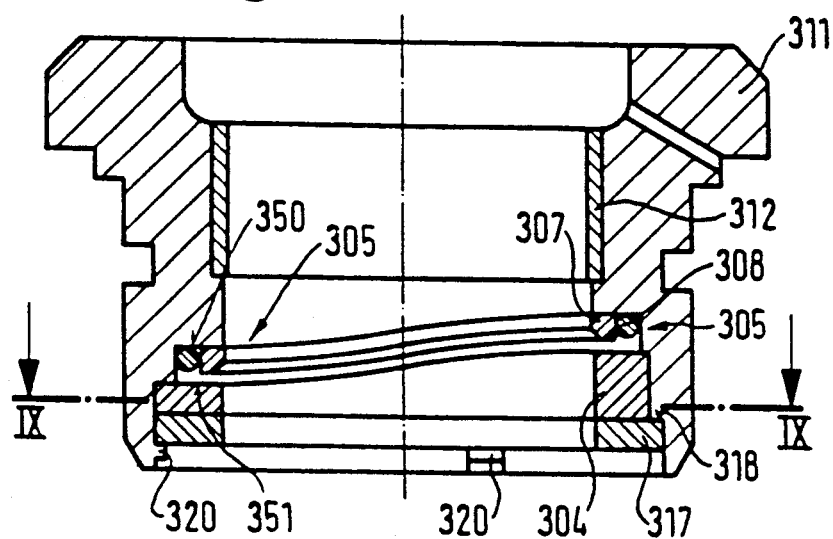
FIG. 8 is a sectional view through a further embodiment of a sealing unit.
Figure 9:
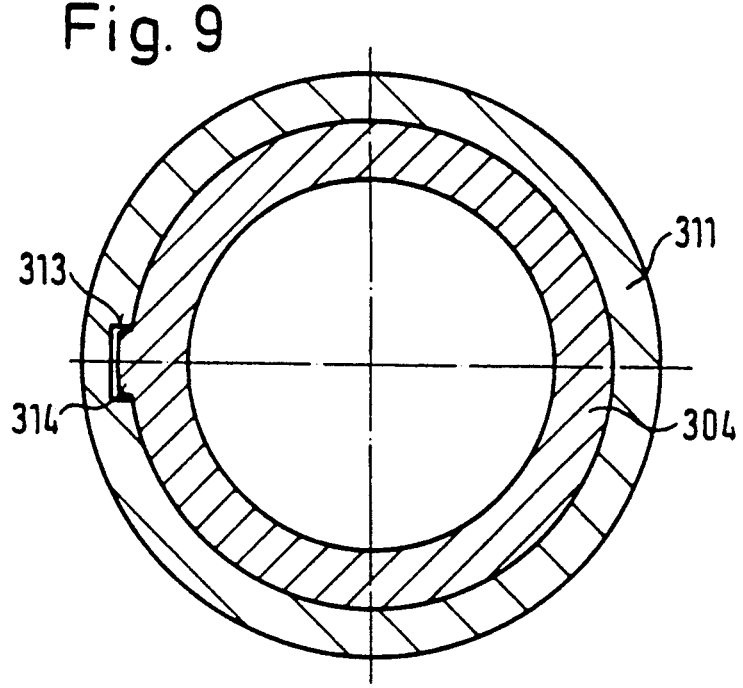
FIG. 9 is a section according to line IX—IX of FIG. 8.

In the embodiment of FIG. 8, the carrier member 311 is provided with the side face 350, whereas the side face 351 of the groove 305 is provided by the groove confining member 304. The groove 305 again accommodates the sealing ring 307 and the 0-ring 308. For axial fixation of the groove confining member 304, the cover plate 317 is maintained on the shoulder face 318 by the caulking lugs 320. The sliding sleeve 312 is pressed into the carrier member 311. From FIG. 9, one can see that the groove confining member 304 is angularly centered with respect to the carrier member 311 by an axial groove 313 of the carrier member 311 and by a spline 314 of the groove confining member 304.

In FIG. 10, there is shown a completed spring strut of a motor-vehicle with a further embodiment of a sealing unit. The spring strut comprises an outer cylinder 460 which is combined with a wheel carrier element 461. An inner cylinder 462 is centered with respect to the outer cylinder 460 by a carrier member 411. This carrier member 411 is sealed with respect to the outer cylinder by a sealing ring 463 and with respect to the inner cylinder by a sealing ring 464. The upper end of the outer cylinder 460 is crimped over the carrier member 411.

The carrier member 411 is provided with a sliding sleeve 412. A piston rod 465 is introduced into the cavity 466 within the inner cylinder 462 through the carrier member 411 and is radially supported by the sliding sleeve 412. A sealing groove 405 is defined by a side face 451 on the carrier member 411, by a side face 450 of a groove confining member 403 and by a bottom surface 452 of the carrier member 411. The groove confining member 403 is accommodated within an internal annular recess 458 of the carrier member 411. In downwards direction, the groove confining member 411 is secured by the inwards crimped portion 460a of the outer cylinder 460. The groove confining member 403 is angularly located with respect to the carrier member 411 by groove and spline means 468. The carrier member 411 is angularly located with respect to the outer cylinder 460 and with respect to the wheel carrier 461 by a spherical depression 469 engaging into a groove 470 of the carrier member 411.

The annular groove 405 accommodates a sealing ring 407 and an O-ring 408. The piston rod 465 is provided with a diagrammatically illustrated piston unit 471. The cavity 466 is filled with pressurized liquid. This pressurized liquid can pass through the sliding sleeve 412 up to the sealing ring 407. It is easily understandable that the left-hand half of the cylindrical surface 473 of the piston rod 465 is subject to the pressure of the liquid on a larger height than the right-hand half of this cylindrical surface.

Therefore, the liquid pressure exerts a resulting force K as illustrated by the arrow K. This is due to the undulated location of the sealing ring 407. Assuming now that a side force F is exerted on the spring strut by the respective vehicle wheel, one can understand that this side force is substantially compensated for by the hydraulic compensating force K. Such, the sealing ring 407 is prevented from overload. Friction of the axially moving piston rod 465 in the left-hand side of the drawing is reduced. Wear of the sealing ring 407 is also reduced. It is easily understandable that one can optimize the resulting compensation force K by appropriate positioning of the planar sections 9 as shown in FIGS. 2 and 4. The precise location of this planar sections 9 is selected according to the specific conditions of the wheel suspension including the spring strut.

A liquid which might escape through the sealing ring 407 is collected in an annular space 474 and can return to the annular space 475 by a channel 476,477 through the carrier member 411. The annular space 475 is partially filled with liquid in its lower part and partially filled with air in its upper part. The limit between the liquid and the air is indicated by 478.

It can easily be understood that the unit comprising the cylinders 460 and 462 and the piston rod 465 could also be encapsulated within an external housing, in which case the wheel carrier element 461 is fixed to said external housing (not shown). In this case, a further angular positioning would be necessary between the cylinder 460 and the external housing.

Figure 11:
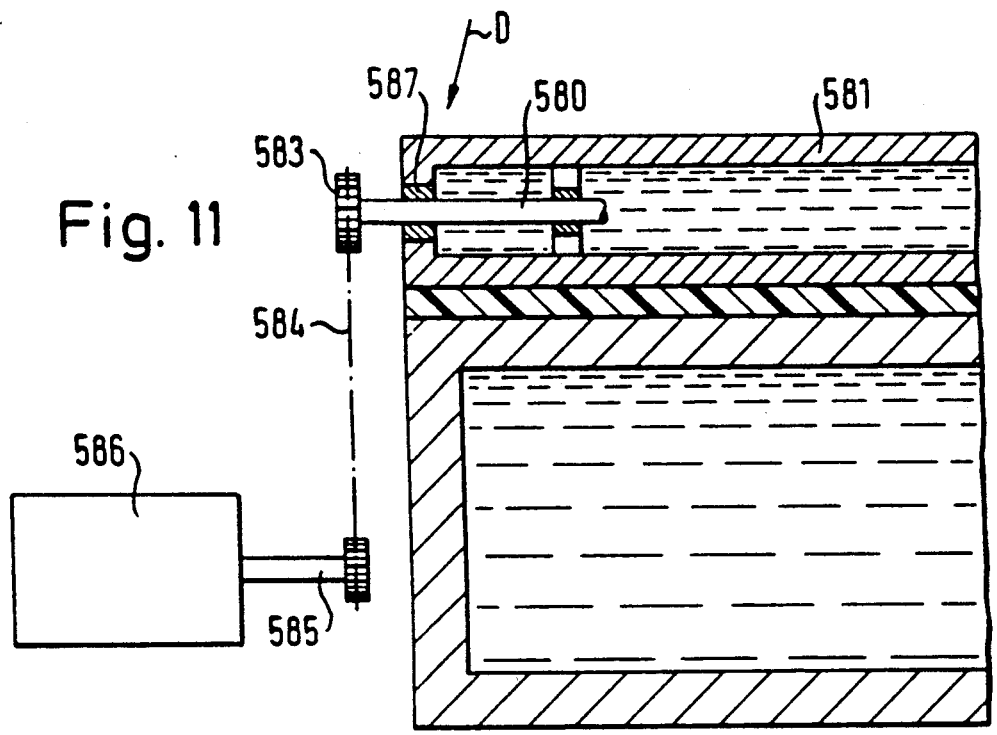
FIG. 11 is a section through an engine housing with a rotating shaft sealingly guided through a sealing unit of the present invention and FIG. 12 is an enlarged detail view of FIG. 11 at D.
Figure 12:
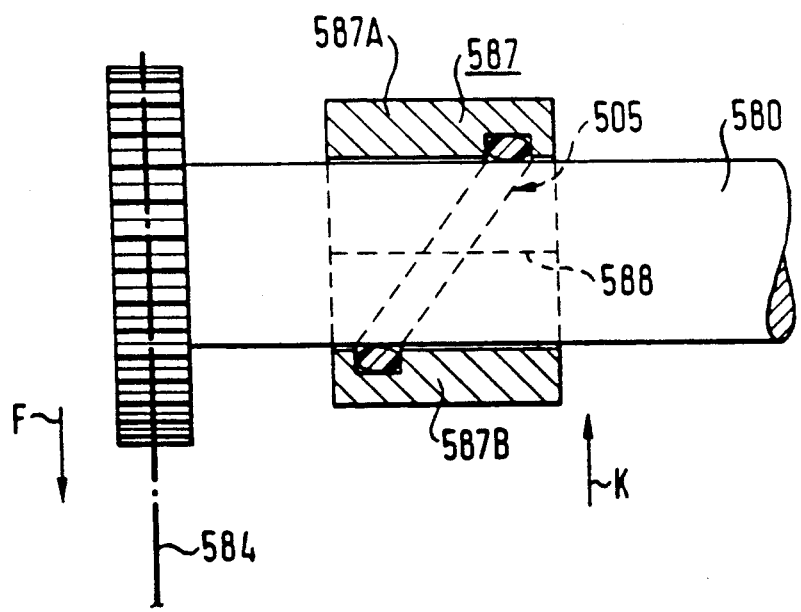

In FIG. 11, there is diagrammatically shown an engine housing of an internal combustion engine. A shaft 580 is rotatably mounted in the upper part 581 of the engine housing. This shaft 580 carries a chain wheel 583 which is connected by a chain 584 with an input shaft 585 of a driven unit 586, e.g. an electric power generator 586. The shaft 580 is sealed with respect to the housing 581 by a sealing unit 587. The sealing unit 587 is shown in more detail in FIG. 12. The sealing groove is again designated by 505. This sealing unit is divided in a plane of section 588 into two groove confining segments 587A and 587B. A lubricant under pressure of e.g. 5 bar is present within the housing 581. This lubricant pressure effects a resulting compensation force K onto the shaft 580. This compensation force K compensates for a load F exerted on the shaft 580 by the chain or belt 584. While the side faces of the groove 505 are both provided in both of the annular segments 587A and 587B, it is readily understandable that these segments 587A and 587B can easily be manufactured by a moulding or sintering process.

Needless to say that the sealing unit 587 is positioned in axial, radial and angular position with respect to the housing 581 by positioning means similar to the positioning means as shown in FIGS. 1 to 10.

Considering now simultaneously FIG. 10 and FIG. 2 it is preferable to have the longer angular section 9 of the sealing ring 7 positioned on the left-hand side of FIG. 10 such that a high compensation force K can be obtained with a relatively small height difference of the localization line 455 between the left-hand side and the right-hand side of FIG. 10.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A container rod assembly comprising a container (462) having a cavity (466) confined by wall means (462, 411) and a cylindrical rod member (465) having an axis and extending in axial direction through said wall means (462, 411), said rod member (465) passing adjacent said wall means (462, 411) through a sealing unit (405, 407, 408) and being movable in at least one of an axial direction and a circumferential direction around said axis, said sealing unit (405, 407, 408) comprising a radially inwards open annular groove (405) adjacent an external cylindrical face (473) of said rod member (465), said annular groove (405) accommodating a sealing ring arrangement (407, 408) sealing said rod member (465) with respect to said cavity (466), said annular groove (405) being confined by two axially spaced and substantially axially oppositely directed annular side faces (450, 451) and by a substantially radially inwards directed bottom surface (452), one (451) of said side faces (450, 451) being nearer to said cavity (466), each one of said side faces (450, 451) being an undulated side face following a localization line (455) around said axis, said localization line (455) having variable distance (h) from a reference plane (456) axially fixed with respect to said container (462) and perpendicular to the axis of said rod member (465), said sealing unit (405, 407, 408) comprising at least two separate sealing groove confining members (403, 411), one (403) of said sealing groove confining members (403, 411) providing a first portion (450) of said side faces (450, 451) and the other one (411) of said sealing groove confining members (403, 411) providing a second portion (451) of said side faces (450, 451), at least one of said sealing groove confining members (403, 411) with the respective portion (450, 451) of said side faces (450, 451) having a shape such as to be formable by one of a pressure-moulding process, an injection-moulding process, a cold-shaping process, a sintering process and a die-casting process,
said side faces (450, 451) being substantially equidistant in axial direction along said localization line (455).

2. A container rod assembly as set forth in claim 1, at least one of said sealing groove confining members (403,411) being made from one of a synthetic plastics material and a metallic material.

3. A container rod assembly as set forth in claim 1, at least one of said sealing groove confining members (403,411) being an annularly closed confining member providing an annularly complete side face (450,451).

4. A container rod assembly as set forth in claim 3, a first one (403) of said sealing groove confining members (403,411) being an annularly closed confining member (403) providing a first annularly complete side face (450) and a second one (411) of said sealing groove confining members (403,411) being a further annularly closed confining member providing a second annularly complete side face (451).

5. A container rod assembly as set forth in claim 1, said sealing groove confining members (403,411) being provided with positioning means (458,468) positioning said sealing groove confining members (403,411) with respect to each other in a predetermined relative operational position.

6. A container rod assembly as set forth in claim 5, said sealing groove confining members (403,411) being provided with at least one of axially, radially and circumferentially effective positioning means (458,468).

7. A container rod assembly as set forth in claim 5, said positioning means (313,314) comprising first positioning means (314) on a first one (304) of said sealing groove confining members (304,311) and second positioning means (313) on a second one (311) of said sealing groove confining members (304,311), said first positioning means (314) and said second positioning means (313) being in direct mutual engagement.

8. A container rod assembly as set forth in claim 5, said at least two sealing groove confining members (203,204) being assembled with and positioned with respect to a common carrier member (211) by respective positioning means (216).

9. A container rod assembly as set forth in claim 5, said at least two sealing groove confining members (403,411) having interengaging annular positioning means (458) for positioning said sealing groove confining members (403,411) both in axial and radial direction in a relative operational position.

10. A container rod assembly as set forth in claim 9, said sealing groove confining members (403,411) being positioned in an angular direction about said axis in a relative angular operational position by angular positioning means (468).

11. A container rod assembly as set forth in claim 10, said angular positioning means comprising interengaging groove and spline means (313,314).

12. A container rod assembly as set forth in claim 10, said angular positioning means comprising a positioning pin (115) intersecting with said sealing groove confining members (103,104).

13. A container rod assembly as set forth in claim 10, said angular positioning means (216) comprising a positioning ball (216) engageable with ball engagement faces of said sealing groove confining members (203,204).

14. A container rod assembly as set forth in claim 1, at least one (411) of said at least two sealing groove confining members (403,411) providing at least a portion of said bottom surface (452) of said groove (405).

15. A container rod assembly as set forth in claim 14, the complete bottom surface (452) of said groove (405) being provided by said at least one (411) of said sealing groove confining members (403,411).

16. A container rod assembly as set forth in claim 1, said at least two sealing groove confining members (203,204) being accommodated within a radially inner annular recess (258) of an annular carrier member (211).

17. A container rod assembly as set forth in claim 16, said sealing groove confining members (203,204) being in sandwich arrangement within said annular carrier member (211).

18. A container rod assembly as set forth in claim 17, said sandwiched sealing groove confining members (203,204) being axially fixed within said carrier member (211) by a cover member (217) covering said annular recess (258) at one axial end thereof.

19. A container rod assembly as set forth in claim 18, said cover member (217) being axially positioned by a shoulder face (218) of said carrier member (211).

20. A container rod assembly as set forth in claim 19, said cover member (217) being axially fixed by said shoulder face (218) in a first axial direction and by deformations (220) of said carrier member (211) in a second axial direction.

21. A container rod assembly as set forth in claim 1, said sealing ring means (7,8) comprising at least one sealing ring (7) made of reinforced synthetic plastics material.

22. A container rod assembly as set forth in claim 1, said sealing ring means (7,8) comprising at least one sealing ring (7) made of a lubricant-containing sintered bronze.

23. A container rod assembly as set forth in claim 1, said bottom surface (52) having a polygonal contour about said axis.

24. A container rod assembly as set forth in claim 1, said localization line (55) having two substantially diametrically opposite sections (9) substantially parallel to said reference plane (56).

25. A container rod assembly as set forth in claim 24, said opposite sections (9) substantially parallel to said reference plane (56) having different circumferential lengths.

26. A container rod assembly as set forth in claim 25, said opposite sections (9) substantially parallel to said reference plane (56) being asymmetrically located with respect to a diameter through said axis.

27. A container rod assembly as set forth in claim 1, said sealing groove confining members (587A,587B) being annular segments (587A,587B), said annular segments (587A,587B) having a circumferential length of ≦180°, said annular segments (587A,587B) providing a portion of each of said side faces.

28. A container rod assembly as set forth in claim 1, said container (462) containing a pressurized fluid, an external portion of said rod member (465) extending beyond said wall means (462,411) outside said cavity (466) being loaded by a radial load (F) in a predetermined radial direction, said localization line (455) being angularly located such with respect to said pre-determined radial direction (F) that said pressurized fluid exerts a compensation force (K) onto said rod member (465) substantially opposite to said load (F) adjacent said sealing unit (405,407,408).

29. A container rod assembly as set forth in claim 1, said sealing unit (405,407,408) being located in a carrier member (411), said carrier member (411) providing an annular guiding face (412) for said rod member (465).

30. A container rod assembly as set forth in claim 1, a further one of said side faces being located in a plane substantially perpendicular to said axis, said sealing ring arrangement having variable height along said localization line.

31. A container rod assembly as set forth in one of claim 1,
said container (462) being a cylindrical container (462) of a shock absorber unit, said rod member (465) being a piston rod member (465) of said shock absorber unit, said piston rod member (465) being axially movable with respect to said sealing unit (405,407,408).

32. A container rod assembly as set forth in claim 31, said shock absorber unit being part of a spring strut of a motor-vehicle and being subject to transverse forces (F) introduced by a respective vehicle wheel.

33. A container rod assembly as set forth in claim 1, said container (581) being a housing accommodating rotatable drive means, said rod being an exit shaft (580) of said rotatable drive means, said exit shaft (580) being connected with torque transmission means (584,585) outside said cavity.

34. A container rod assembly comprising a container (462) having a cavity (466) confined by wall means (462, 411) and a cylindrical rod member (465) having an axis and extending in axial direction through said wall means (462, 411), said rod member (465) passing adjacent said wall means (462, 411) through a sealing unit (405, 407, 408) and being movable in at least one of an axial direction and a circumferential direction around said axis, said sealing unit (405, 407, 408) comprising a radially inwards open annular groove (405) adjacent an external cylindrical face (473) of said rod member (465), said annular groove (405) accommodating a sealing ring arrangement (407, 408) sealing said rod member (465) with respect to said cavity (466), said annular groove (405) being confined by two axially spaced and substantially axially oppositely directed annular side faces (450, 451) and by a substantially radially inwards directed bottom surface (452), one (451) of said side faces (450, 451) being nearer to said cavity (466), each one of said side faces (450, 451) being an undulated side face following a localization line (455) around said axis, said localization line (455) having variable distance (h) from a reference plane (456) axially fixed with respect to said container (462) and perpendicular to the axis of said rod member (465),
said sealing unit (405, 407, 408) comprising at least two separate sealing groove confining members (403, 411), one (403) of said sealing groove confining members (403, 411) providing a first portion (450) of said side faces (450, 451) and the other one (411) of said sealing groove confining members (403, 411) providing a second portion (451) of said side faces (450, 451), at least one of said sealing groove confining members (403, 411) with the respective portion (450, 451) of said side faces (450, 451) having a shape such as to be formable by one of a pressure-moulding process, an injection-moulding process, a cold-shaping process, a sintering process and a die-casting process,
said side faces (450, 451) being substantially equidistant in axial direction along said localization line (455),
said sealing ring arrangement (407, 408) being in contact with said rod member (465).

35. A container rod assembly comprising a container (462) having a cavity (466) confined by wall means (462, 411) and a cylindrical rod member (465) having an axis and extending in axial direction through said wall means (462, 411), said rod member (465) passing adjacent said wall means (462, 411) through a sealing unit (405, 407, 408) and being movable in at least one of an axial direction and a circumferential direction around said axis, said sealing unit (405, 407, 408) comprising a radially inwards open annular groove (405) adjacent an external cylindrical face (473) of said rod member (465), said annular groove (405) accommodating a sealing ring arrangement (407, 408) sealing said rod member (465) with respect to said cavity (466), said annular groove (405) being confined by two axially spaced and substantially axially oppositely directed annular side faces (450, 451) and by a substantially radially inwards directed bottom surface (452), one (451) of said side faces (450, 451) being nearer to said cavity (466), at least said one (451) of said side faces (450, 451) being an undulated side face following a localization line (455) around said axis, said localization line (455) having variable distance (h) from a reference plane (456) axially fixed with respect to said container (462) and perpendicular to the axis of said rod member (465),
said sealing unit (405, 407, 408) comprising at least two separate sealing groove confining members (403, 411), one (403) of said sealing groove confining members (403, 411) providing a first portion (450) of said side faces (450, 451) and the other one (411) of said sealing groove confining members (403, 411) providing a second portion (451) of said side faces (450, 451), at least one of said sealing groove confining members (403, 411) with the respective portion (450, 451) of said side faces (450, 451) having a shape such as to be formable by one of a pressure-moulding process, an injection-moulding process, a cold-shaping process, a sintering process and a die-casting process,
said sealing unit (405, 407, 408) being located in a carrier member (411), said carrier member (411) providing an annular guiding face (412) for said rod member (465),
said annular guiding face (412) being axially separated from said sealing ring arrangement (407, 408).

36. A container rod assembly comprising a container (462) having a cavity (466) confined by wall means (462, 411) and a cylindrical rod member (465) having an axis and extending in axial direction through said wall means (462, 411), said rod member (465) passing adjacent said wall means (462, 411) through a sealing unit (405, 407, 408) and being movable in at least one of an axial direction and a circumferential direction around said axis, said sealing unit (405, 407, 408) comprising a radially inwards open annular groove (405) adjacent an external cylindrical face (473) of said rod member (465), said annular groove (405) accommodating a sealing ring arrangement (407, 408) sealing said rod member (465) with respect to said cavity (466), said annular groove (405) being confined by two axially spaced and substantially axially oppositely directed annular side faces (450, 451) and by a substantially radially inwards directed bottom surface (452), one (451) of said side faces (450, 451) being nearer to said cavity (466), each one of said side faces (450, 451) being an undulated side face following a localization line (455) around said axis, said localization line (455) having variable distance (h) from a reference plane (456) axially fixed with respect to said container (462) and perpendicular to the axis of said rod member (465), said sealing unit (405, 407, 408) comprising at least two separate sealing groove confining members (403, 411), one (403) of said sealing groove confining members (403, 411) providing a first portion (450) of said side faces (450, 451) and the other one (411) of said sealing groove confining members (403, 411) providing a second portion (451) of said faces (450, 451), at least one of said sealing groove confining members (403, 411) with the respective portion (450, 451) of said side faces (450, 451) having a shape such as to be formable by one of a pressure-moulding process, an injection-moulding process, a cold-shaping process, a sintering process and a die-casting process, said side faces (450, 451) being substantially equidistant in axial direction along said localization line (455), said sealing ring arrangement (407, 408) having an axial height less than or equal to the height of the annular groove (405) and being in contact with said rod member (465), said sealing unit (405, 407, 408) being located in a carrier member (411), said carrier member (411) providing an annular guiding face (412) for said rod member (465), said annular guiding face (412) being axially outside said sealing ring arrangement (407, 408).

37. A container rod assembly comprising a container (462) having a cavity (466) confined by wall means (462, 411) and a cylindrical rod member (465) having an axis and extending in axial direction through said wall means (462, 411), said rod member (465) passing adjacent said wall means (462, 411) through a sealing unit (405, 407, 408) and being movable in at least one of an axial direction and a circumferential direction around said axis, said sealing unit (405, 407, 408) comprising a radially inwards open annular groove (405) adjacent an external cylindrical face (473) of said rod member (465), said annular groove (405) accommodating a sealing ring arrangement (407, 408) sealing said rod member (465) with respect to said cavity (466), said annular groove (405) being confined by two axially spaced and substantially axially oppositely directed annular side faces (450, 451) and by a substantially radially inwards directed bottom surface (452), one (451) of said side faces (450, 451) being nearer to said cavity (466), at least said one (451) of said side faces (450, 451) being an undulated side face following a localization line (455) around said axis, said localization line (455) having variable distance (h) from a reference plane (456) axially fixed with respect to said container (462) and perpendicular to the axis of said rod member (465), said sealing unit (405, 407, 408) comprising at least two separate sealing grove confining members (403, 411), one (403) of said sealing groove confining members (403, 411) providing a first portion (450) of said side faces (450, 451) and the other one (411) of said sealing groove confining members (403, 411) providing a second portion (451) of said side faces (450, 451), at least one of said sealing groove confining members (403, 411) with the respective portion (450, 451) of said side faces (450, 451) having a shape such as to be formable by one of a pressure-moulding process, an injection-moulding process, a cold-shaping process, a sintering process and a die-casting process, said localization line (35) having two substantially diametrically opposite sections (9) substantially parallel to said reference plane (56), said opposite sections (9) having different circumferential lengths.

38. A container rod assembly as set forth in claim 37, said opposite sections (9) being asymmetrically located with respect to a diameter through said axis.

* * * * *